United States Patent [19]

Nakao et al.

[11] Patent Number: 5,689,581
[45] Date of Patent: Nov. 18, 1997

[54] METHODS OF INSPECTION

[75] Inventors: Masaya Nakao, Moriguchi; Susumu Maruno, Osaka; Yasuharu Shimeki, Suita, all of Japan

[73] Assignee: Matsushita Electric Industrial Co., Ltd., Osaka, Japan

[21] Appl. No.: 395,114

[22] Filed: Feb. 27, 1995

[30] Foreign Application Priority Data

Feb. 28, 1994 [JP] Japan ..................... 6-029600

[51] Int. Cl.⁶ .................................. G06K 9/62
[52] U.S. Cl. .................................. 382/156
[58] Field of Search ............... 382/155, 156, 382/157, 141, 149; 395/21, 23; 348/129, 130

[56] References Cited

U.S. PATENT DOCUMENTS

| | | | |
|---|---|---|---|
| 3,950,733 | 4/1976 | Cooper et al. | 382/157 |
| 4,893,346 | 1/1990 | Bishop | 382/155 |
| 5,003,490 | 3/1991 | Castelaz et al. | 382/157 |
| 5,465,308 | 11/1995 | Hutcheson et al. | 382/156 |
| 5,481,621 | 1/1996 | Furatomi et al. | 382/156 |

OTHER PUBLICATIONS

Maruno et al., Perception of Letters by Adaptive Propagation and Quantization Neurons, Tech. Rep., Inst Electron. Comm. Eng. Japan, NC 91–51, pp. 23–28, 1991.

*Primary Examiner*—Yon J. Couso
*Attorney, Agent, or Firm*—Greenblum & Bernstein P.L.C.

[57] ABSTRACT

An inspection method for judging whether an object is defective or not uses a neural network comprising an input neuron which quantizes input feature quantities based on present quantization ranges, a plurality of intermediate neuron coupled to the input neuron with coupling coefficients determined from quantized feature quantities and a pair of output neurons coupled to respective intermediate neurons with intermediate coupling coefficients obtained by learning in which the intermediate coupling coefficients are initially set so that any object is judged to be defective and are fitted so that if an object is nondefective then it is judged to be nondefective by performing learning with use of nondefective objects.

6 Claims, 16 Drawing Sheets

METHODS OF INSPECTION

BACKGROUND OF THE INVENTION

1. Field of the Invention

The present invention relates to a method of inspection that judges whether inspected objects are nondefective or not based on feature quantities detected from image data of the inspected objects obtained by using visual sensors such as TV cameras.

2. Description of the Related Art

A prior method of inspection using visual sensors is described with reference to FIGS. 17 to 24. In FIG. 17, 10 and 11 are inspected objects, where 10 is a machine part that is combined with other machine parts in later processes following the inspection process. 11 is grease applied to machine part 10 and used for lubricating a sliding interface between machine parts. If the quantity of grease is not adequate or if the applied place is shifted, then appropriate lubrication is not obtained, so that frictional resistance becomes too great for the machine part to function normally during machine operation.

Grease is provided from a nozzle of a dispenser 12. If the viscosity of the grease changes, or the nozzle is stuffed, or bubbles enter the grease, or the point of the nozzle is shifted by vibration or the like, then the applied quantity or place changes. Therefore, it is necessary to inspect the applied quantity and place of the grease.

FIG. 18 shows an inspection apparatus using a prior method of inspection. In FIG. 18, 20 is an inspected object, 21 is a dispenser, 22 is a TV camera, and 23 is an image processor. Image processor 23 digitizes a video signal input from TV camera 22 to create image data and judge the applied state of grease based on the image data, so that if the applied state is inappropriate, then the results are output to an external device through an I/O unit (not shown in FIG. 18), and the external device performs reapplication processing or the like.

FIG. 19 shows the configuration of image processor 23 shown in FIG. 18, where an analog-to-digital converter 31 digitizes an image signal coming from the TV camera to obtain image data and store it in image data memory 32. The image data consists of pixels, each pixel being expressed by an 8-bit gray level (256 levels), with 512 pixels in the direction parallel to the scanning lines of the camera and 480 pixels in the direction vertical to the scanning lines.

In the following description, the position coordinate of a pixel in the direction parallel to the scanning lines of the camera is denoted by x, and the position coordinate of the pixel vertical to the scanning lines is denoted by y, so that the position of each pixel is expressed by (x, y). In particular, the position of the pixel at the upper left corner is denoted by (0, 0), and the values of x and y increase as the pixel moves right and down.

A microcomputer 33 performs image processing of the image data to judge the applied state of grease, and an I/O unit 34 outputs the judgment results to an external device.

FIG. 20 shows an outline of the processing by microcomputer 33. A digital-to-binary conversion process 40 makes the value of each pixel if its image density is less, that is, darker, than a predetermined threshold value and 0 otherwise. The converted image is called a binary image. In this binary image, the pixel value of grease-applied part becomes 1, and the pixel value of the other part becomes 0.

A feature-quantity calculating process 41 calculates feature quantities of grease-applied part separated by the above binary-image conversion processing. In this example, the feature quantities are the applied area (pixel numbers) and the center of gravity of the applied part.

The applied area is calculated by the equation (1):

$$a = \sum_{x=0}^{511} \sum_{y=0}^{479} b(x, y), \quad (1)$$

where a is the applied area and b(x, y) is the binary pixel value at coordinates (x, y).

The center of gravity (gx, gy) of the applied area is calculated by the equation (2):

$$\begin{bmatrix} gx \\ gy \end{bmatrix} = 1/a \sum_{x=0}^{511} \sum_{y=0}^{479} \begin{bmatrix} x \cdot b(x, y) \\ y \cdot b(x, y) \end{bmatrix}. \quad (2)$$

A judgment process 42 performs the processing shown in FIG. 21. That is, this process successively compares the feature quantities with the upper limits and lower limits for nondefectives, and judges the inspected object to be nondefective if all the feature quantities are within the limits, and judges the object to be defective, if at least one of the feature quantities is outside the limit.

An inspecting-standard determining process 43 determines standards for inspection. Among methods of determining standards are learning methods of trial and error employed when data distributions of feature quantities are unknown, methods of using data distributions employed when data distributions of feature quantities are known, and hybrid methods of these methods.

FIG. 22 illustrates how the above judgment is formed. In FIG. 22, the abscissa and ordinate respectively express the values of feature quantities 1 and 2. L1 and U1 are respectively the lower and upper limits for feature quantity 1, and L2, U2 are respectively the lower and upper limits for feature quantity 2. Inspected objects having feature quantities located in the shaded area are judged to be nondefective and inspected objects having feature quantities located outside the shaded area are judged to be defective.

However, the prior method described above requires a great deal of time and labor for inspecting-standard determining process 43 to determine the upper and lower limits for each feature quantity by trial-and-error methods. The prior method also requires a great deal of time and labor for inspecting-standard determining process 43 to collect a large amount of data of feature quantities and determine the upper and lower limits based on the distributions by data-distribution methods.

Further, if distributions of feature quantities of inspected objects are as shown in FIG. 23 in the coordinate plane of feature quantities, where the shaded area corresponds to nondefectives and the other area corresponds to defectives, then the prior method as shown in FIG. 22 can not ensure accurate judgment.

SUMMARY OF THE INVENTION

An object of the present invention is therefore to solve the aforementioned problems and to provide methods of inspection that do not require much time and labor in determining inspecting standards and to make it possible to inspect objects based on accurate inspecting standards.

In order to achieve the aforementioned objective, according to the present invention, a visual sensor picks up an image of an inspected object to output a video signal, an analog-to-digital conversion process digitizes the video signal to create image data, and a feature-quantity calculating process calculates feature quantities based on the image data to output into the input neuron of a neural network. The neural network comprises an input neuron, which is an adaptive propagation and vector-quantization neuron, a plurality of intermediate neurons, each uniquely corresponding to a quantization range, and two output neurons respectively corresponding to nondefectives and defectives. The input neuron quantizes feature quantities input thereto based on predetermined quantization ranges to output into each intermediate neuron a corresponding first output signal calculated based on a corresponding coupling coefficient, determined by the quantization, between the input neuron and the intermediate neuron. Each of the intermediate neurons outputs into each of the output neurons a corresponding second output signal obtained by multiplying the first output signal by a corresponding intermediate coupling coefficient determined by learning. Each of the output neurons sums the second output signals input thereto to convert into and output judgement data by a predetermined function, and the magnitudes of the judgement data of the output neurons are compared to discriminate the inspected object.

According to a first method of inspection in accordance with the present invention, intermediate coupling coefficients are initially set so that any inspected object is judged to be defective before learning, and the intermediate coupling coefficients are revised by learning so that if an inspected object is nondefective, then it is judged to be nondefective after learning.

According to a second method of inspection in accordance with the present invention, the intermediate coupling coefficients are initially set so that the output neuron corresponding to nondefectives outputs a greatest magnitude of data for the input feature quantities of an object expected to be nondefective, and the output neuron corresponding to defectives outputs a greatest magnitude of data for the input feature quantities of an object expected to be defective.

According to a third method of inspection in accordance with the present invention, the quantization ranges near an expected border between the area of input feature quantities of nondefectives and the area of input feature quantities of defectives are narrowed and the quantization ranges in the other part are widened.

According to a fourth method of inspection in accordance with the present invention feature quantities calculated by the feature-quantity calculating process is input to the input neuron after being converted with conversion tables.

In a prior method of inspection that performs discrimination based on feature quantities calculated from image data, the first to last feature quantities are successively compared with inspecting standards, and if all the feature quantities are within the inspecting standards, then the inspected object is judged to be nondefective, and if at least one of the feature quantities is outside the inspecting standards, then the inspected object is judged to be defective.

Among methods of determining standards are learning methods of trial and error employed when distributions of feature quantities are unknown, methods of using data distributions employed when data distributions of feature quantities are known, and hybrid methods of these methods. However, both the learning methods and data-distribution methods require time and labor.

As an automatic learning method there is a method of using a neural network having an adaptive propagation and vector-quantization neuron. According to this method, feature quantities calculated from image data are compared with inspecting standards by the neural network. In a learning process of the neural network, based on an algorithm for adaptive and vector-quantization neurons, quantization ranges are automatically propagated and intermediate coupling coefficients are automatically revised, so that inspecting standards can be learned. However, unless the learning process is properly oriented, it takes a long time, and good results are not necessarily obtained.

The methods of the present invention orients the learning process of the neural network having an adaptive propagation and vector-quantization neuron in preferable directions, so that good results are obtained through learning for a short time or at an early stage of learning.

The first method of the present invention orients the learning process by setting initial intermediate coupling coefficients so that any inspected object nondefective or defective, is judged to be defective before learning. In order to perform correct inspection, this method requires learning of only nondefective objects to obtain correct intermediate coupling coefficients. Since in actual inspection processes most of products in the line are nondefective, this method requires a short time for learning, and unless the network learns to judge a defective to be nondefective, no error that a defective is judged to be nondefective occurs, so that inspection of great reliance is made possible.

The second method of the present invention orients the learning process by setting initial intermediate coupling coefficients so that the output neutron corresponding to nondefectives outputs a greatest magnitude of data for the input feature quantities of an object expected to be nondefective, and the output neuron corresponding to defectives outputs a greatest magnitude of data for the input feature quantities of an object expected to be defective. This method enables the inspection to form good judgements even at an early stage of learning, and successively improves the accuracy of judgment through learning for intermediate coupling coefficients.

The third method of the present invention sets quantization ranges near an expected border between the area of input feature quantities of nondefectives and the area of input feature quantities of defectives to be narrowed and the quantization ranges in the other part to be widened. This method allows the total number of quantization ranges to be reduced, so that required memory capacity proportionate to the total number can be reduced.

The fourth method of the present invention converts, using conversion tables, feature quantities calculated by the feature-quantity calculating process to input to the input neuron, so that if inspecting standards change, then only alteration of the conversion tables is required, and relearning becomes unnecessary.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments of methods of inspection in accordance with the present invention will be described below with reference to the attached drawings FIGS. 1 to 16.

Figure 17:
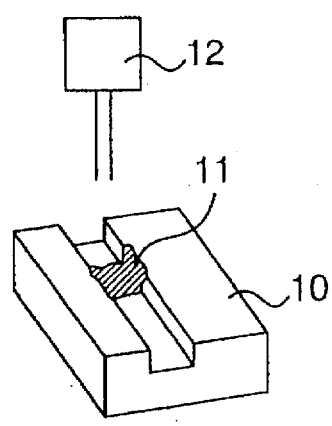
FIG. 17 shows a perspective view of an inspected object.
Figure 18:
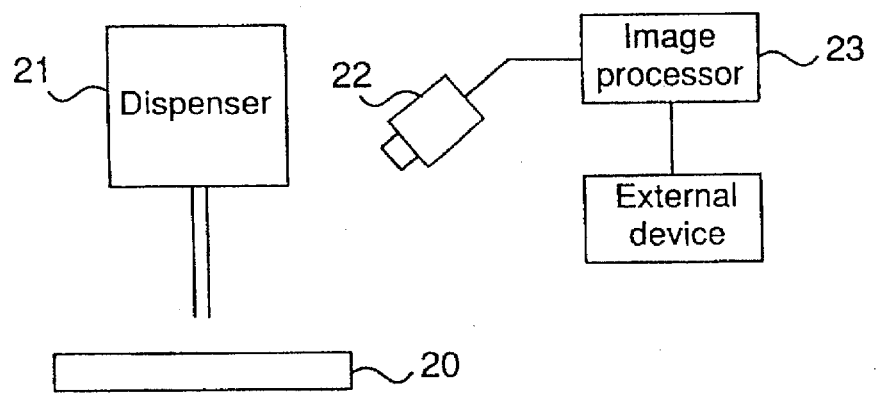
FIG. 18 shows a block diagram of a conventional inspection apparatus.
Figure 19:
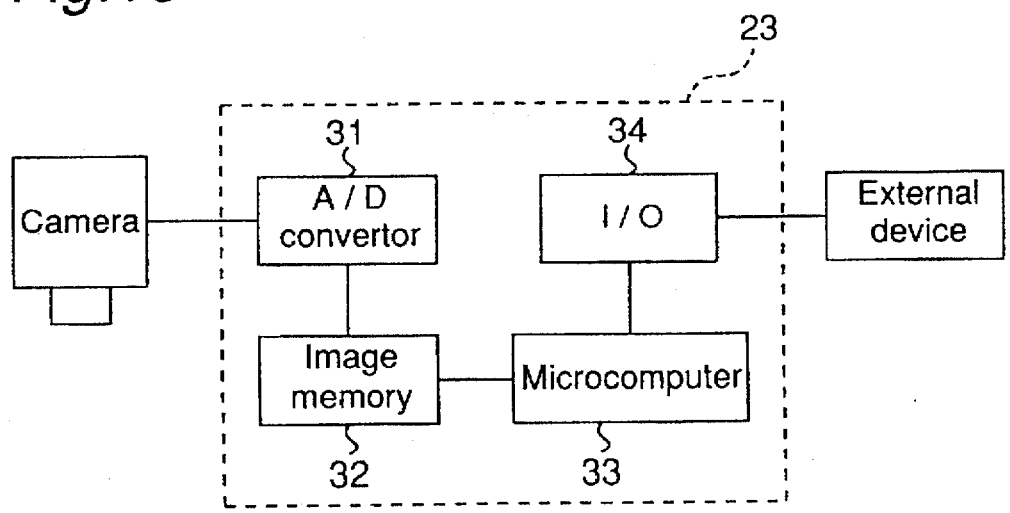
FIG. 19 shows a block diagram of a conventional image processor shown in FIG. 18.
Figure 20:
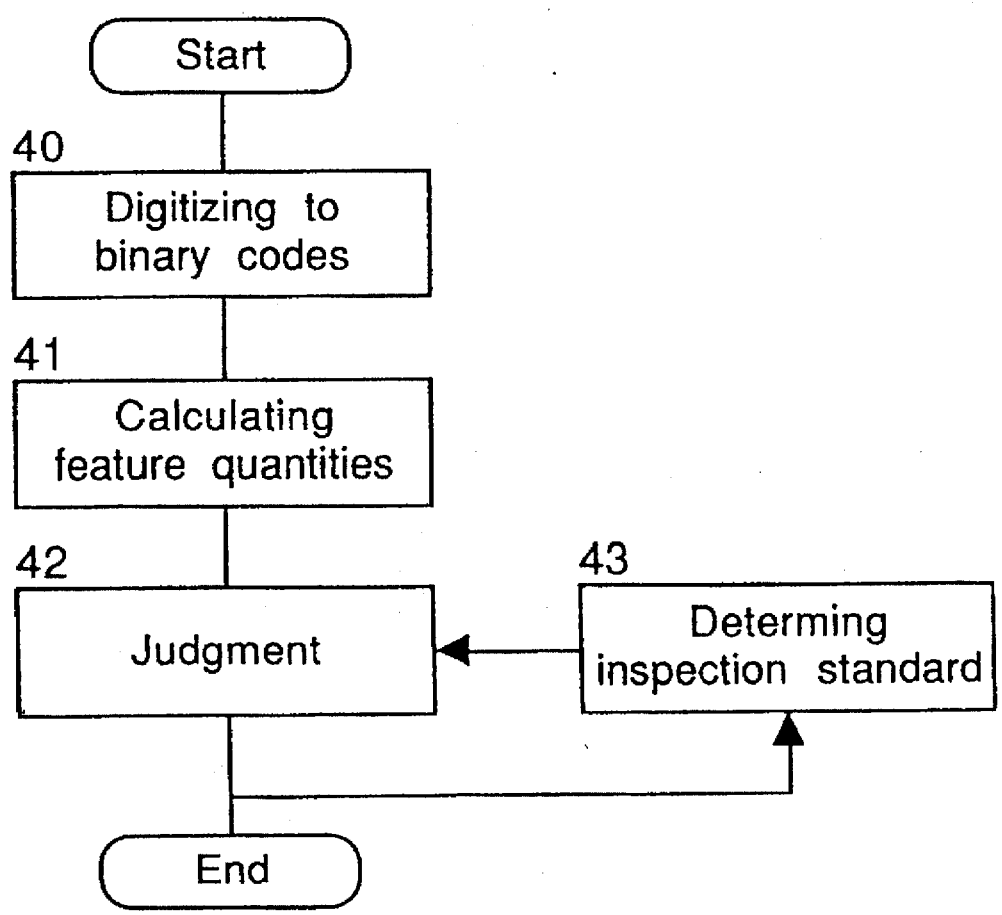
FIG. 20 shows a flowchart of a conventional processing executed by a micro computer.
Figure 21:
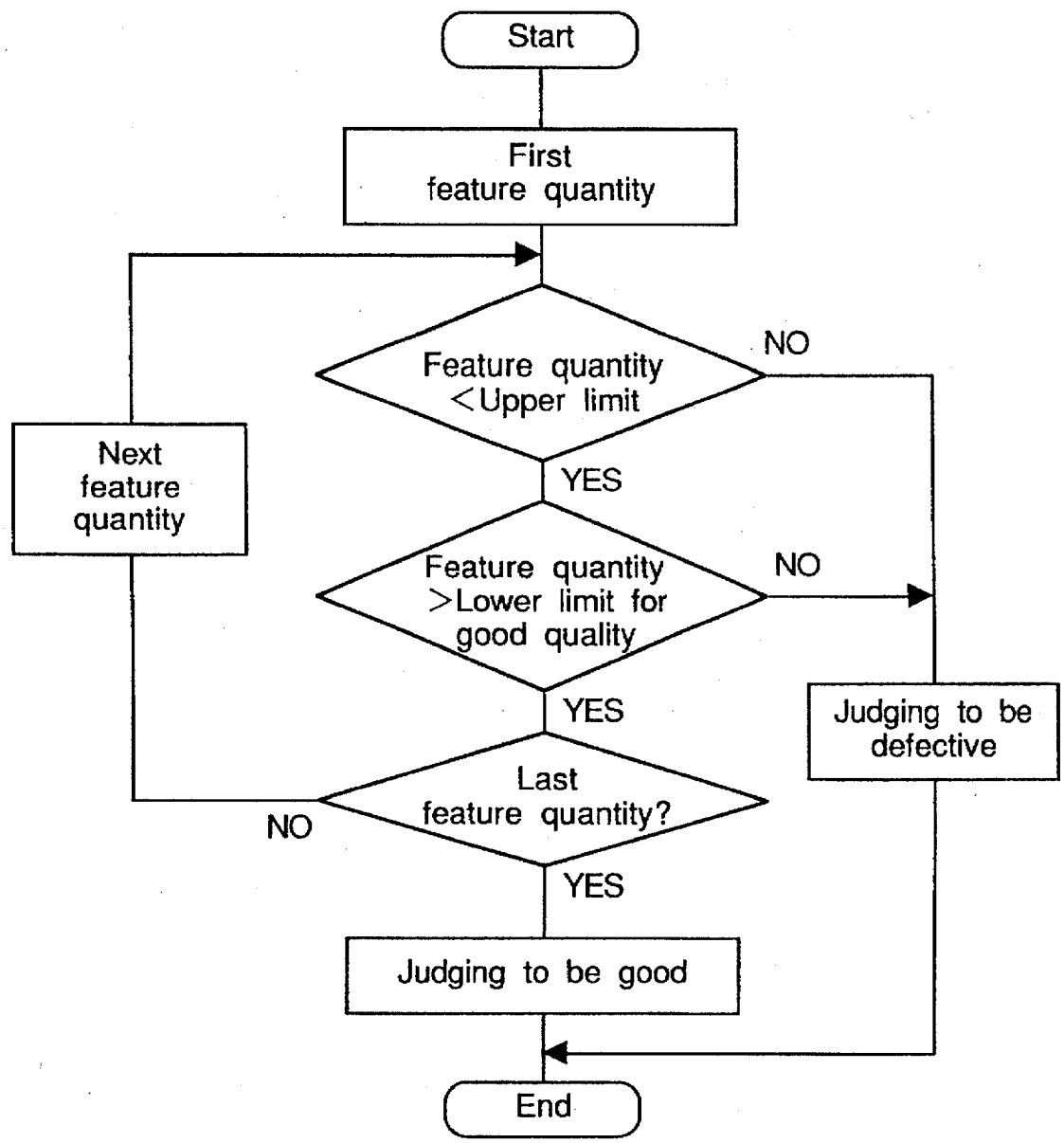
FIG. 21 shows a flowchart of discrimination processing by a prior method.
Figure 22:
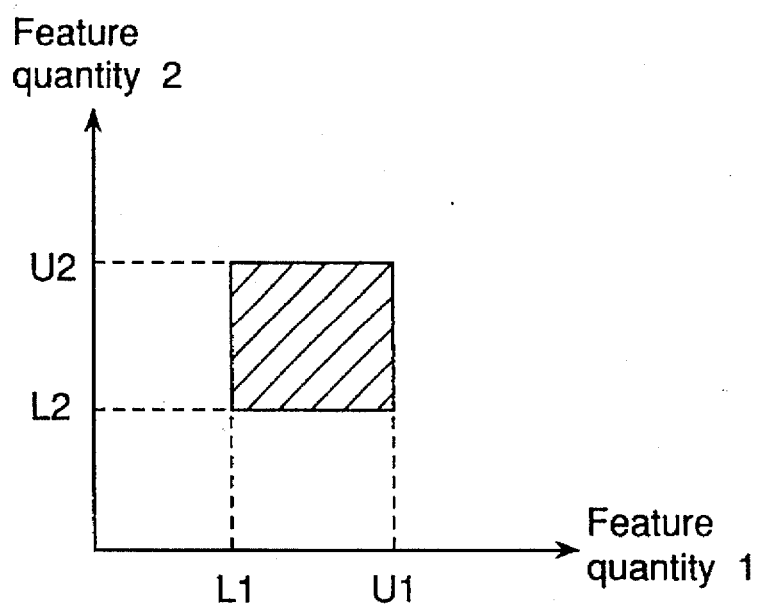
FIG. 22 shows discriminant areas of feature quantities in the prior method.
Figure 23:
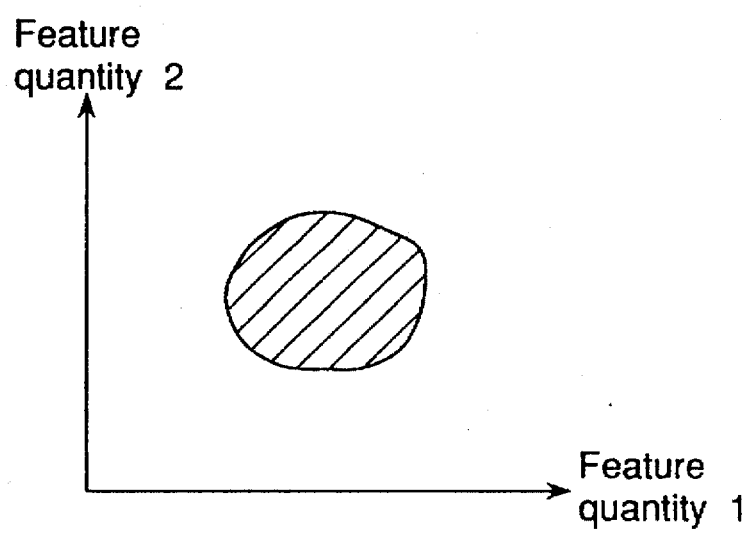
FIG. 23 shows a correct discriminant area of feature quantities.

The methods of present invention differ from the prior method shown in FIG. 20 in the discrimination process and inspecting-standard determining process processed by a microcomputer. An inspected object shown in FIG. 17, an inspection apparatus shown in FIG. 18, and an image processing apparatus shown in FIG. 19 are the same as for the prior method, so that descriptions of these parts are omitted in the following.

Figure 1:
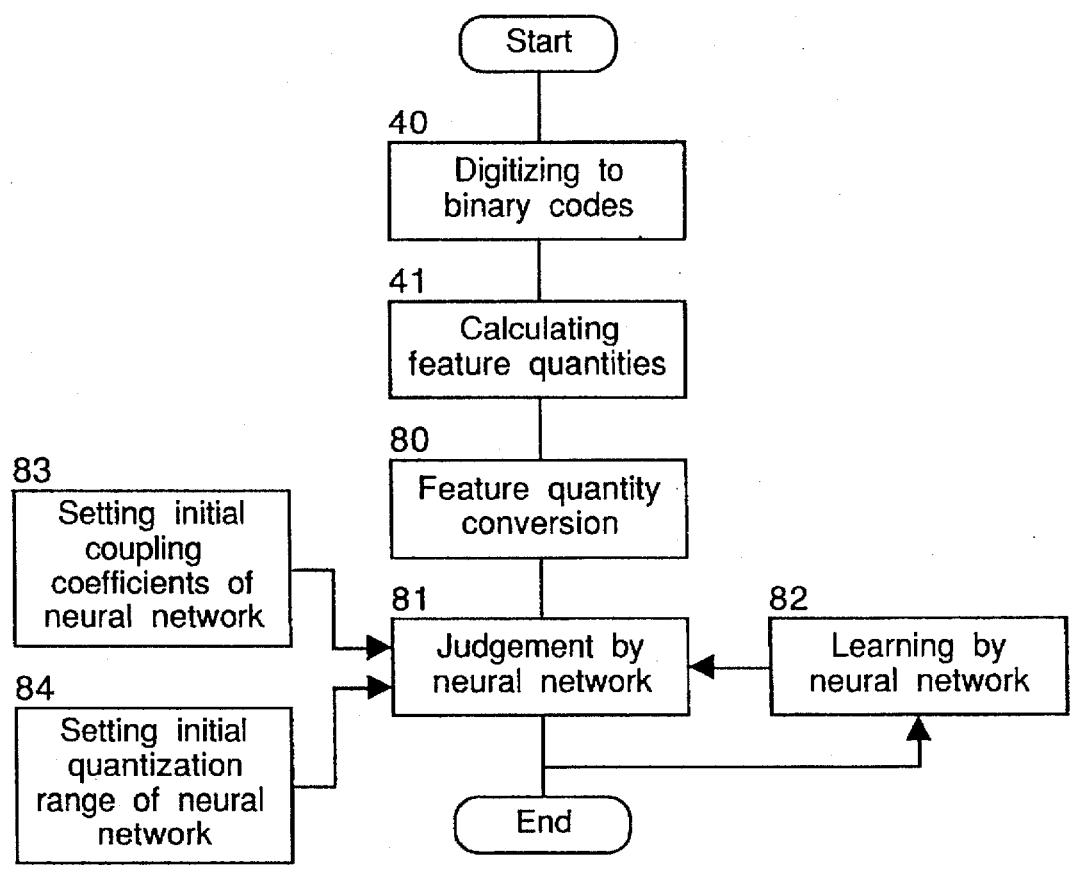
FIG. 1 shows a flowchart of discrimination processing in accordance with the present invention.

FIG. 1 shows an embodiment of processing by the microcomputer of the inspection apparatus using the methods of the present invention. In FIG. 1, a digital-to-binary conversion process 40 and a feature-quantity calculating process 41 are the same as the prior method, so that the descriptions of these processes are omitted. A feature-quantity conversion process 80, a discrimination process 81 using a neural network, a learning process 82 of the neural network, an initial coupling-coefficient setting process 83 for the neural network, and an initial quantization-range setting process 84 for the neural network are features of the present invention.

The present invention is, in fact, a method of inspection using a neural network, and the model of the neural network has an adaptive propagation and vector-quantization neuron proposed by Maruno et al. ("Perception of letters by adaptive propagation and quantization neurons," Tech. Rep. Inst. Electron. Comm. Eng. Japan, NC 91–51, pp. 23–28).

An embodiment of a neural network using the above adaptive propagation and quantization neuron in accordance with the present invention is described below with reference to FIG. 2. The total number of feature quantities is two in FIG. 2 to simplify the description, but the total number may be more than two.

Figure 2:
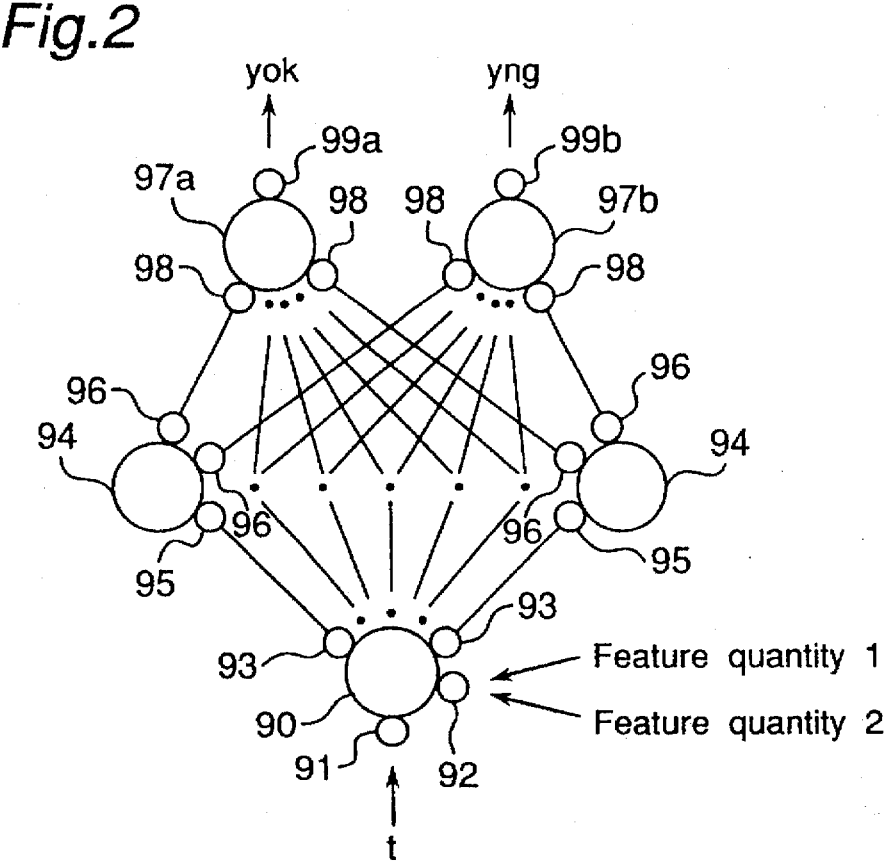
FIG. 2 shows the configuration and operation of an embodiment in accordance with the present invention.
Figure 3:
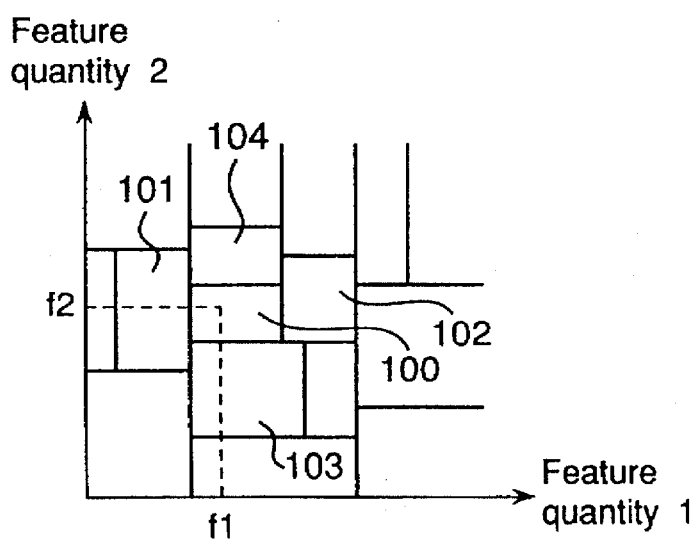
FIG. 3 shows quantization ranges of feature quantities in accordance with the present invention.

In FIG. 2, the present embodiment is composed of a first neuron 90, which is an input neuron, second neurons 94, which are intermediate neurons, and third neurons 97, which are output neurons. The first neuron 90 is a quantization neuron having a first signal-input terminal 91, a feature-quantity input terminal 92, and first signal-output terminals 93. Feature quantities 1 and 2 input to feature-quantity input terminal 92 are quantized with predetermined quantization ranges as shown in FIG. 3 and processed based on coupling coefficients determined by the quantization to be output as first output signals.

The total number of second neurons 94 is the same as the total number of the above quantization ranges. The quantization ranges are propagated by an algorithm for adaptive propagation and vector-quantization neurons, either with instructions of a supervisor or automatically when information obtained by learning reaches certain conditions. Further, intermediate coupling coefficients used for calculation are revised by learning from initial intermediate coupling coefficients.

The input signal t to first neuron 90 is multiplied by coupling coefficients determined by quantization processing of feature quantities input to first neuron 90, and the results are input to second neurons 94 as first output signals. The input signal t may be an arbitrary constant, and t=1 in the present embodiment. The outputs of the network are calculated in proportion to the constant t, so that, in case of comparing the magnitude of the outputs, the final judgment is not affected by the value of the constant t.

Each of second neurons 94 has a second signal-input terminal 95 and a second signal-output terminal 96. Each of second neurons 94 performs calculating processing of a signal input to terminal 95 based on intermediate coupling coefficients, between the second and third neurons, which are initially predetermined and revised by later learning, so that second output signals are output from terminals 96.

Each of third neurons 97 has third signal-input terminals 98 and a third signal-output terminal 99. Each of third neurons 97 performs calculating processing of second output signals input to terminal 98 based on a function, and obtained third output signals $y_{ok}$ and $y_{ng}$ are respectively output from terminal 99 of corresponding third neurons 97. In particular, each of third neurons 97 may simply output the sum of input signals thereto. The total number of third neurons 97 is the total number of necessary kinds of data. For example, in case of judgement whether an inspected object is nondefective or defective, the total number is 2, and in case of perception of the English alphabet, the total number is 62.

The neural network of the present invention shown in FIG. 2 has features described above, so that propagation of quantization ranges and revision of intermediate coupling coefficients, which are performed automatically by learning, can be oriented in a desired direction by determining initial coupling coefficients and quantization ranges.

If the input signal to first neuron 90 is t in the above description, the first output signal $x_i$ output from first signal-output terminal 91 into the i-th second neuron is given by the equation (3).

$$x_i = t \cdot \tau_i, \tag{3}$$

where t=1 in the present embodiment, and $\tau_i$ is the coupling coefficient, between first neuron 90 and the i-th second neuron, determined by the quantization processing of feature quantities. The method of this calculation is described later.

The i-th second neuron outputs as a second output signal $y_{ij} = t \cdot \tau_i \cdot \tau_{ij}$ to j-th third neuron, that is, $y_{ij}$ is the product of the first output signal $x_i = t \cdot \tau_i$, which is input to second signal-input terminal, and the intermediate coupling coefficient $\tau_{ij}$, which has been revised by learning.

Consequently, the sum $y_j$ of the second output signals $y_{ij}$ received by the j-th third neurons becomes as shown in the equation (4):

$$y_j = \sum_{i=1}^{n} y_{ij} = \sum_{i=1}^{n} x_i \cdot \tau_{ij} = \sum_{i=1}^{n} t \cdot \tau_i \cdot \tau_{ij}, \tag{4}$$

where t=1 in the present embodiment, n is the total number of second neurons 94, and $\tau_{ij}$ is the intermediate coupling coefficient between the i-th second neuron and the j-th third neuron. If the coupling coefficient $\tau_{ij}$ is successively revised by instruction or leaning, desired results are successively obtained.

The output $z_j$ from the j-th third neuron becomes as shown in the equation (5):

$$z_j = f(y_j) = f\left( \sum_{i=1}^{n} t \cdot \tau_i \cdot \tau_{ij} \right), \tag{5}$$

where f is a threshold function.

However, in case of judging whether an inspected object is nondefective or defective, the operation of (5) is unnecessary, and the j-th third neuron may simply output the sum $y_j$ given by the equation (4). In particular, the third neuron 97a corresponding to nondefectives outputs $y_{ok} = y_1$, and the third neuron 97b corresponding to defectives outputs $y_{ng} = y_2$. Then the judgment is formed as follows:

If $y_{ok} > y_{ng}$, then the inspected object is nondefective.

If $y_{ok} < y_{ng}$, then the inspected object is defective.

Next, quantization processing in the present embodiment is described with reference to FIG. 3. Feature quantities input to first neuron 90 are quantized in a two dimensional space as shown in FIG. 3. Then second neurons 94 are composed depending on quantization ranges 100 to 104, and the coupling coefficient $\tau_i$ between each i-th neuron of composed second neurons 94 and first neuron 90 is determined.

Specifically, if feature quantities $f_1$ and $f_2$ are located in the quantization range 100 as shown in FIG. 3, and when the feature quantity $f_q$, where q=1 or 2, is input to first neuron 90, then the coupling coefficient σ100 between the second neuron $94_{100}$ corresponding to quantization range 100 and first neuron 90 is determined as $$\tau_{100} = 1. \tag{6}$$

When the feature quantity $f_q$, Where q=1 or 2, is input to first neuron 90, the coupling coefficients $\tau_{101}$ to $\tau_{104}$ between the second neurons $94_{101}$ to $94_{104}$ of quantization ranges 101 to 104 adjacent 100 to and first neuron 90 are determined as $$\tau_i = \beta \cdot (1 - |f_q - A_q(c)|/|A_q(c) - A_q(i)|), \text{ if } |f_q - A_q(c)| < |A_q(c) - A_q(i)|;$$

$$\tau_i = 0, \text{ if } |f_q - A_q(c)| \geq |A_q(c) - A_q(i)|; \tag{7}$$

where c=100, i=101, . . . , 104, q=1 or 2; and $A_q(i)$ is the average value of input feature quantities $f_q$ plotted in the quantization range i, and β is an arbitrary constant. In the present embodiment, β=0.5. The outputs of the network are calculated in proportion to the constant β, so that, in case of comparing the magnitude of the outputs, the final judgment is not affected by the value of the constant β.

Learning by the neural network propagates the above quantization ranges and revises intermediate coupling coefficients so that judgment by the neural networks become correct. The learning procedure is based on comparing outputs obtained by inputting feature quantities and using current quantization ranges and coupling coefficients with correct judgment results obtained by other means. As described in the aforementioned reference, the learning process is made possible, either externally with instructions of a supervisor or autonomously, by an algorithm for neural networks.

As described above, propagation of quantization ranges and revision of intermediate coupling coefficients are made possible automatically by an algorithm for neural networks. Therefore, learning by human power and confirmation of data distribution through data collection become unnecessary. However, depending on initial setting of quantization ranges and intermediate coupling coefficients, propagation of quantization ranges and revision of intermediate coupling coefficients are not necessarily oriented in desired directions, so that the inspection apparatus may be unworkable.

The present invention orients in desired directions the propagation of quantization ranges and revision of intermediate coupling coefficients, which are automatically performed by learning, by specifying the method of initial setting of quantization ranges and intermediate coupling coefficients. This orientation ensures that learning by human power and the confirmation of data distribution through data collection become unnecessary, so that time and labor required by prior techniques are greatly reduced.

An embodiment of a first method in accordance with the present invention is concerned with initial coupling-coefficient setting process 83 shown in FIG. 1. In particular, process 83 sets the initial intermediate coupling coefficients between second neurons 84 and third neurons 97 so that the outputs of third neurons 97 initially lead to the judgment that any inspected object with any input feature quantities is defective. If the intermediate coupling coefficients are automatically revised by an algorithm for neural networks after this initial setting, then learning and revision are made rapidly to bring out workable conditions because of far more frequent occurrences of nondefectives than defectives in actual processes. Therefore, unless defectives have been taught as nondefectives, there is no error that a defective is mistakenly recognized as nondefective.

Figure 4A:
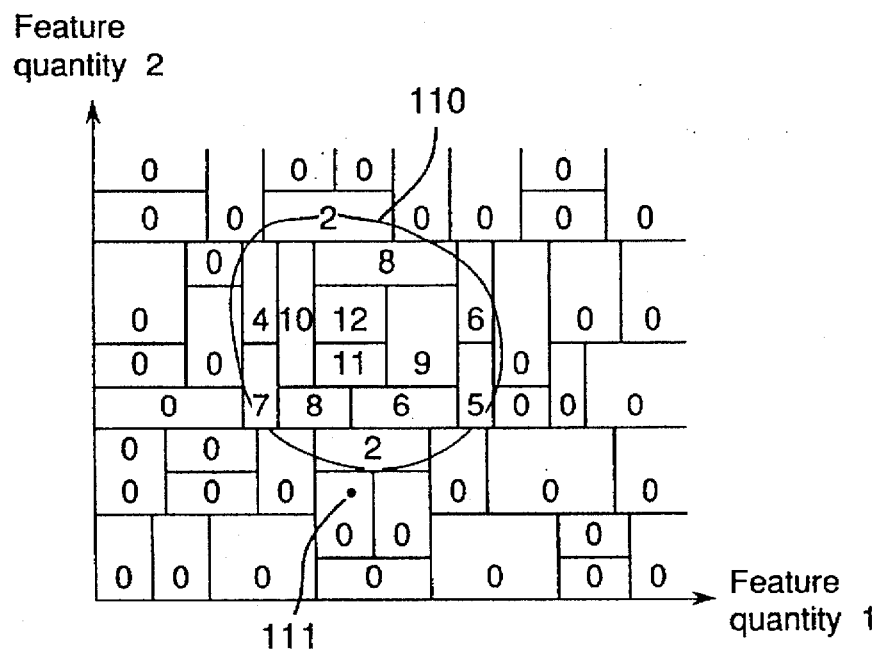
FIGS. 4A and 4B show intermediate coupling coefficients revised by learning.
Figure 4B:
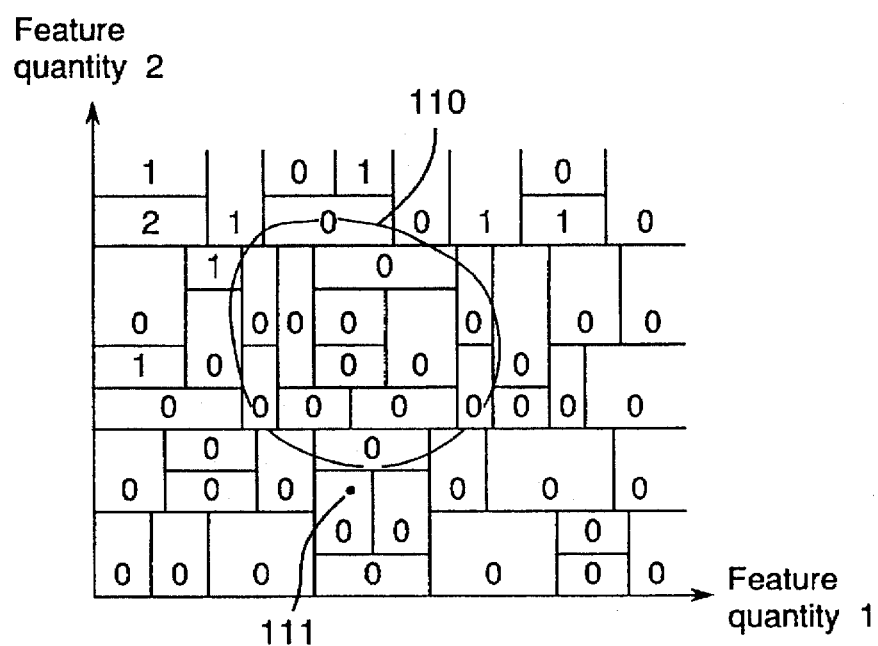

The operation of the embodiment of the first method is described with examples in the following. In FIGS. 4A and 4B, judgments are formed depending on feature quantities 1 and 2, and the area inside the solid curve 110 corresponds to nondefectives and the area outside the curve corresponds to defectives. If the intermediate coupling coefficients between second and third neurons are all initially set at 0, then the revision of the intermediate coupling coefficients are mainly made for the area inside the curve and far less revision is made for the area outside the curve, since the occurrences of nondefectives are far more frequent than the occurrences of defectives. Therefore, after learning, the coupling coefficients with the third neuron 97a, which corresponds to nondefectives, become as shown in FIG. 4A, and the coupling coefficients with the third neuron 97b, which corresponds to defectives, become as shown in FIG. 4B. In these Figures, each rectangle shows a quantization range, and the number within a rectangle shows the intermediate coupling coefficient between the third neuron 97a or 97b and the second neuron that corresponds to the quantization range.

Figure 5:
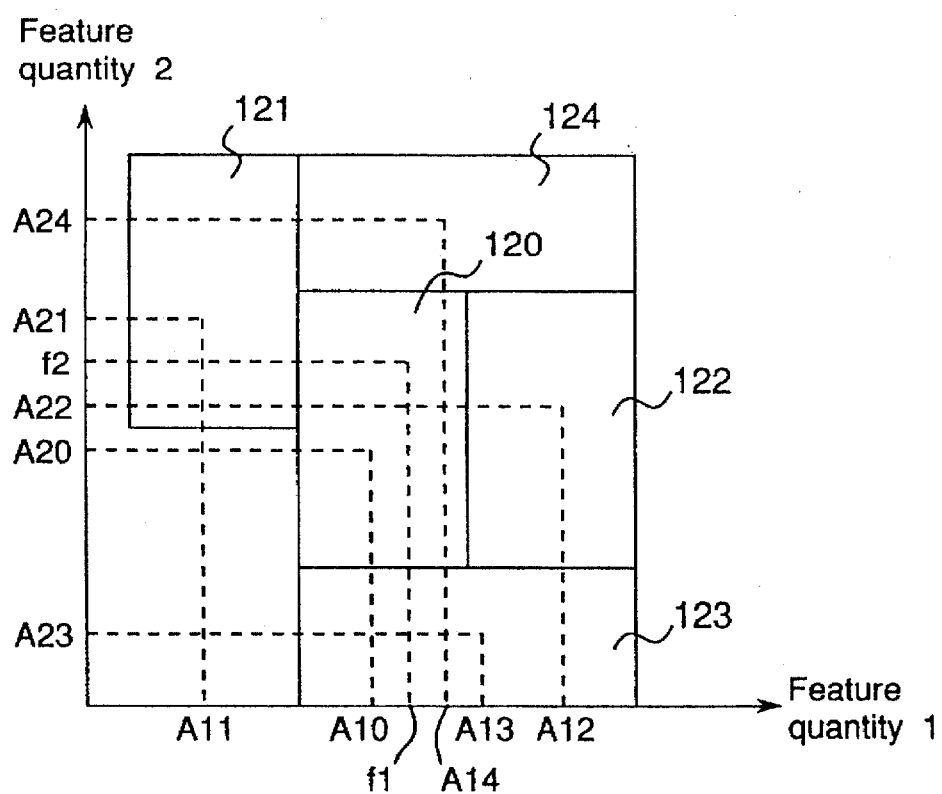
FIG. 5 shows relationships among relevant values for describing how to calculate the outputs of the neural network.

If input feature quantities are the coordinates $(f_1, f_2)$ of the point 111 in FIG. 4A, then relationships among related values are, for example, as shown in FIG. 5, where 120 to 124 show quantization ranges and $(A_{10}, A_{20})$ to $(A_{14}, A_{24})$ are respectively the average values of input data located in quantization ranges 120 to 124.

By equations (4), (6), (7), the outputs $y_{ok}$ and $y_{ng}$ of respective third neurons 97a and 97b, which respectively correspond to nondefectives and defectives, are calculated as follows:

$$y_{ok} = t \cdot \beta \cdot (1-|A_{14}-f_1|/|A_{14}-A_{10}|) \cdot 2 + t \cdot \beta \cdot (1-|A_{24}-f_2|/|A_{24}-A_{20}|) \cdot 2$$

$$y_{ng} = 0, \qquad (8)$$

where $t=1$, $\beta=0.5$.

In this case, although the point 111 is outside the solid curve 110 and represents a defective, the judgment is formed that the inspected object is nondefective, since $y_{ok} > y_{ng}$. In fact, in order to make judgment results always correct, learning is necessary of a significantly large number of defectives, so that if occurrences of defectives are not frequent, the procedure is hard to practice.

Figure 6A:
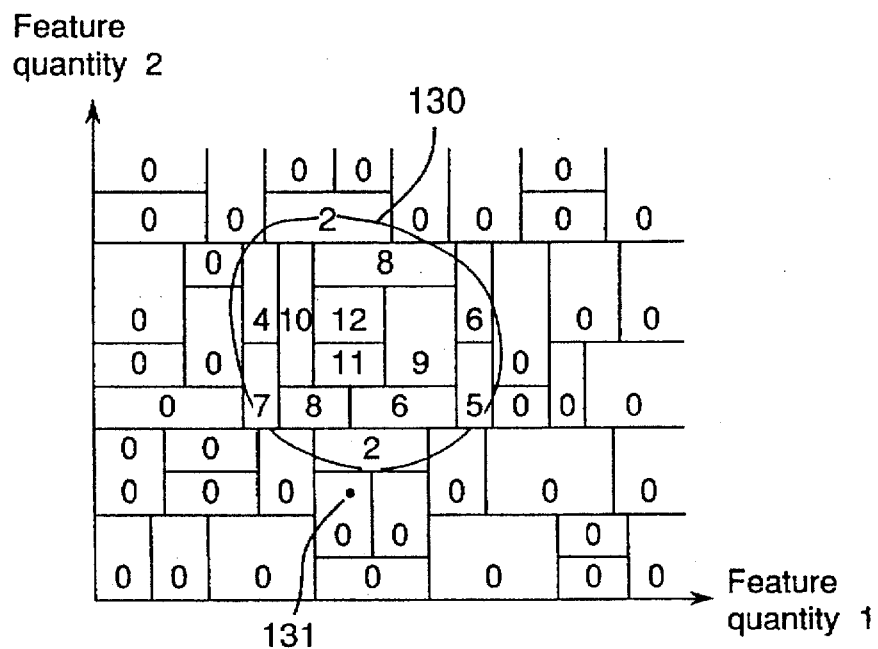
FIGS. 6A and 6B show intermediate coupling coefficients revised by learning when a first method of the present invention is applied.
Figure 6B:
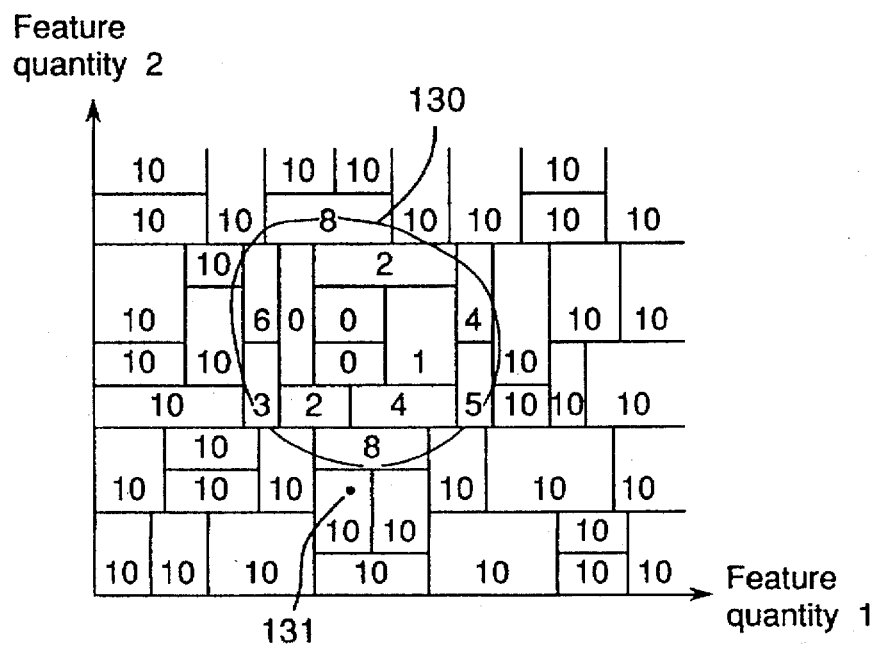

If, on the other hand, the intermediate coupling coefficient between each second neuron and the third neuron 93b corresponding to defectives is initially set at 10, and the intermediate coupling coefficient between each second neuron and the third neuron 93a corresponding to nondefectives is initially set at 0, then the intermediate coupling coefficients become as shown in FIGS. 6A and 6B after learning. FIG. 6A shows the revised intermediate coupling coefficient between each second neuron and the third neuron 93a, and FIG. 6B shows the revised intermediate coupling coefficient between each second neuron 94 and the third neuron 93b. The closed curve 130 shows the boundary between nondefectives and defectives with nondefectives represented by the area inside the curve.

If input feature quantities are represented by the point 131, which is the same point as the point 111, then the relationships among related values are the same as shown in FIG. 5. Then the outputs $y_{ok}$ and $y_{ng}$ of respective third neurons 97a and 97b are calculated as follows:

$$\begin{aligned}
y_{ok} &= t \cdot \beta \cdot (1-|A_{14}-f_1|/|A_{14}-A_{10}|) \cdot 2 + \\
&\quad t \cdot \beta \cdot (1-|A_{24}-f_2|/|A_{24}-A_{20}|) \cdot 2 \\
y_{ng} &= t \cdot 1 \cdot 10 + t \cdot \beta \cdot (1-|A_{12}-f_1|/|A_{12}-A_{10}|) \cdot 10 + \\
&\quad t \cdot \beta \cdot (1-|A_{13}-f_1|/|A_{13}-A_{10}|) \cdot 10 + \\
&\quad t \cdot \beta \cdot (1-|A_{14}-f_1|/|A_{14}-A_{10}|) \cdot 8 + \\
&\quad t \cdot \beta \cdot (1-|A_{23}-f_2|/|A_{23}-A_{20}|) \cdot 10 + \\
&\quad t \cdot \beta \cdot (1-|A_{24}-f_2|/|A_{24}-A_{20}|) \cdot 8
\end{aligned} \qquad (9)$$

where $t=1$, $\beta=0.5$.

In this case, the point 131 is outside the closed curve 130 and represents a defective object, and judgment is formed that the inspected object is defective, since $y_{ok} < y_{ng}$. Therefore, the judgment is correct. In this method, incorrect judgments can be eliminated by learning of few samples.

Figure 7A:
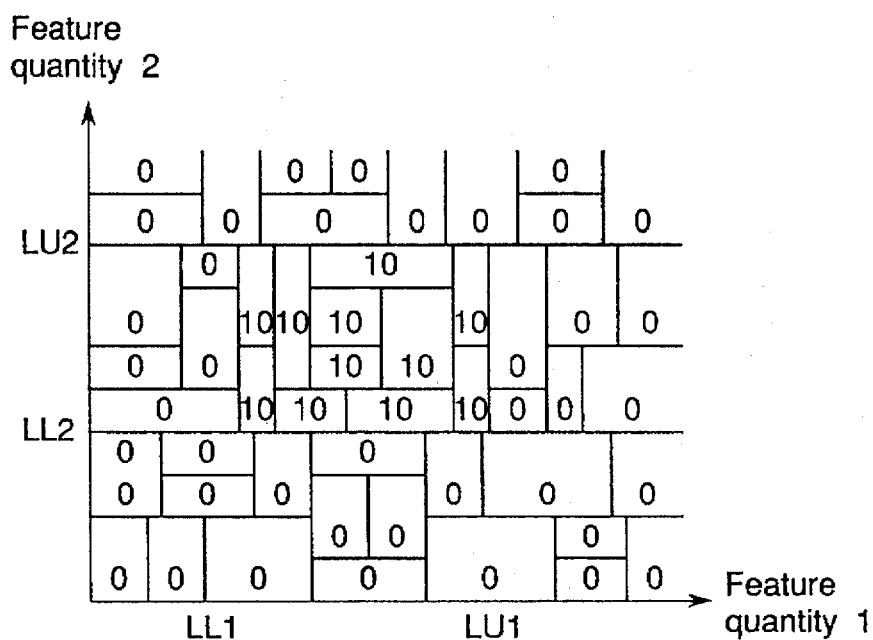
FIGS. 7A and 7B show initial intermediate coupling coefficients set before learning when a second method of the present invention is applied.
Figure 7B:
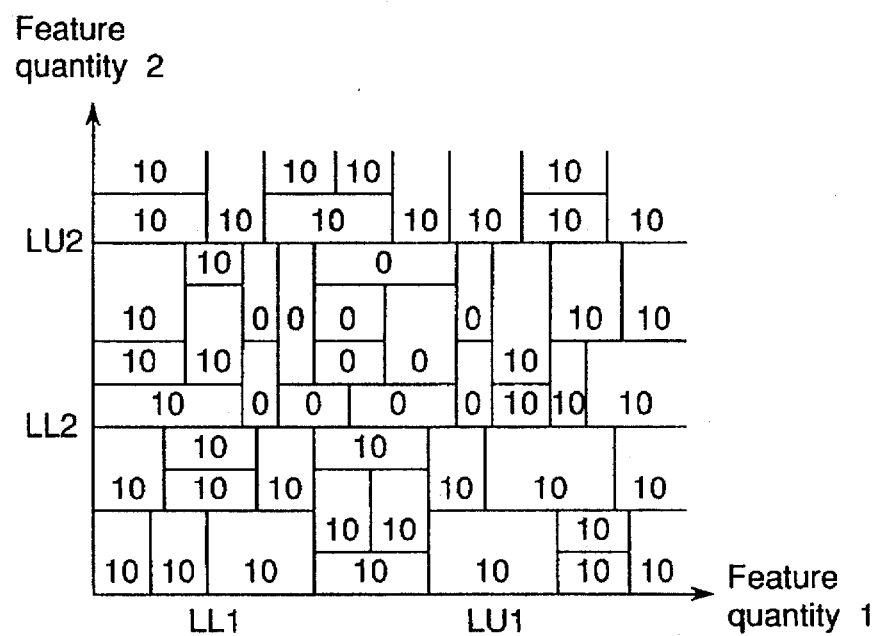

An embodiment of a second method in accordance with the present invention is concerned with initial coupling-coefficient setting process 83 shown in FIG. 1. In particular, process 83 sets the initial intermediate coupling coefficients between second neurons 84 and third neurons 97 as shown in FIGS. 7A and 7B so that the outputs of third neurons 97 lead to the judgment that inspected objects expected to be nondefective are nondefective and inspected objects be expected to be defective are defective. The objective is to make it possible to form correct judgments even during an early period of learning.

Figure 8:
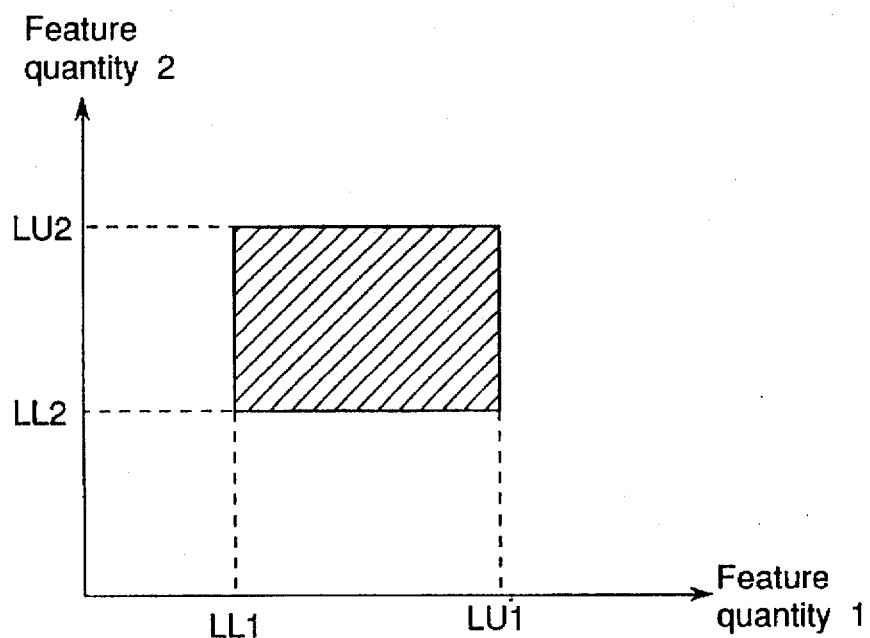
FIG. 8 shows initial discriminant areas of feature quantities determined when the second method is applied.

The operation of the embodiment of the second method is described with examples in the following. In FIGS. 7A and 7B, LU1 and LU2 respectively indicate expected upper limits of feature quantities 1 and 2, and LL1 and LL2 are respectively indicate lower limits of feature quantities 1 and 2. FIG. 8 shows discriminant areas for nondefectives and defectives on the feature quantity plane before learning, and in particular, the shaded area is the discriminant area for inspected objects judged to be nondefectives and the other area is the discriminant area for inspected objects judged to be defectives. By comparing FIGS. 7A, 7B and 8, it is noticed that the present second method includes inspection equivalent to the prior one that determines inspection standards.

Figure 10:
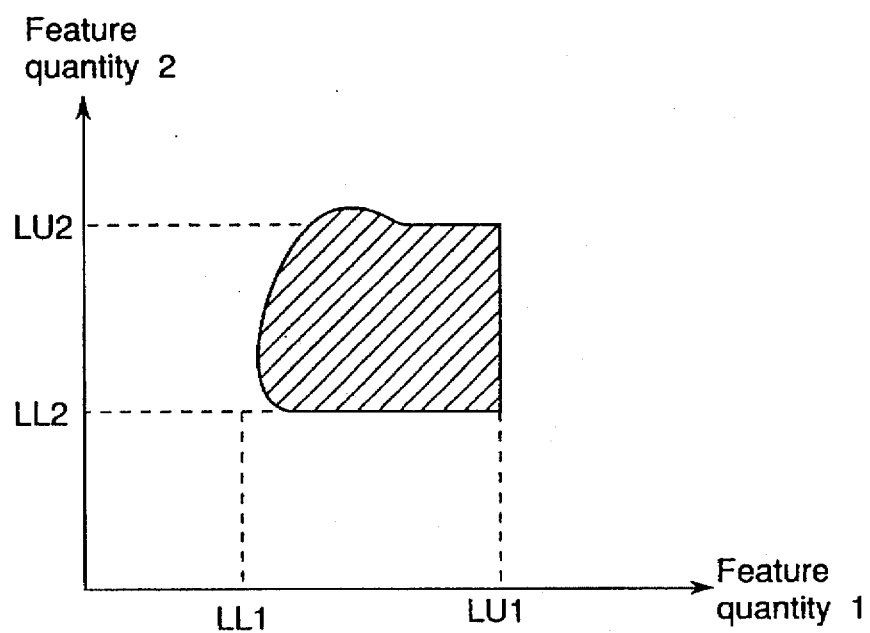
FIG. 10 shows discriminant areas of feature quantities determined after learning when the second method is applied.
Figure 9A:
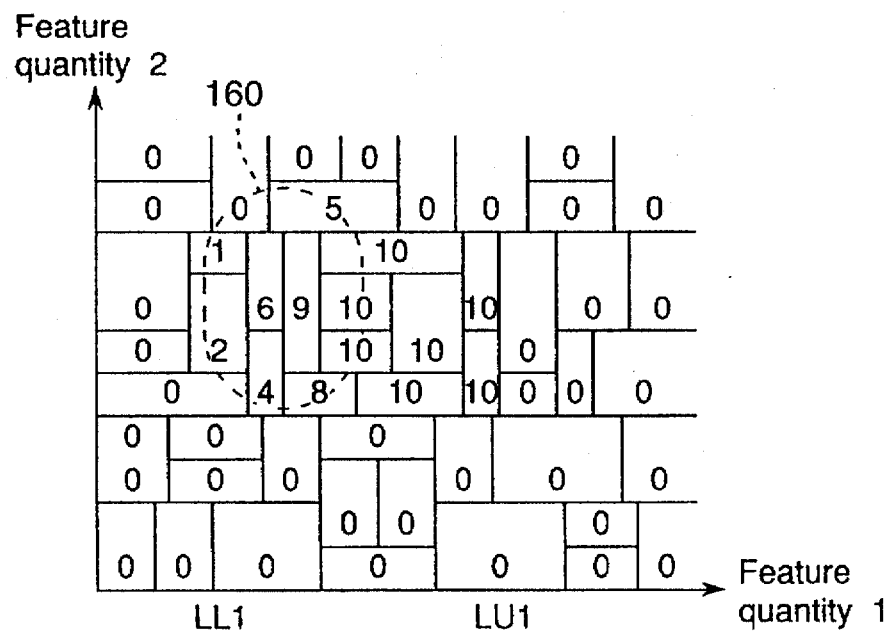
FIGS. 9A and 9B show intermediate coupling coefficients revised by learning when the second method is applied.
Figure 9B:
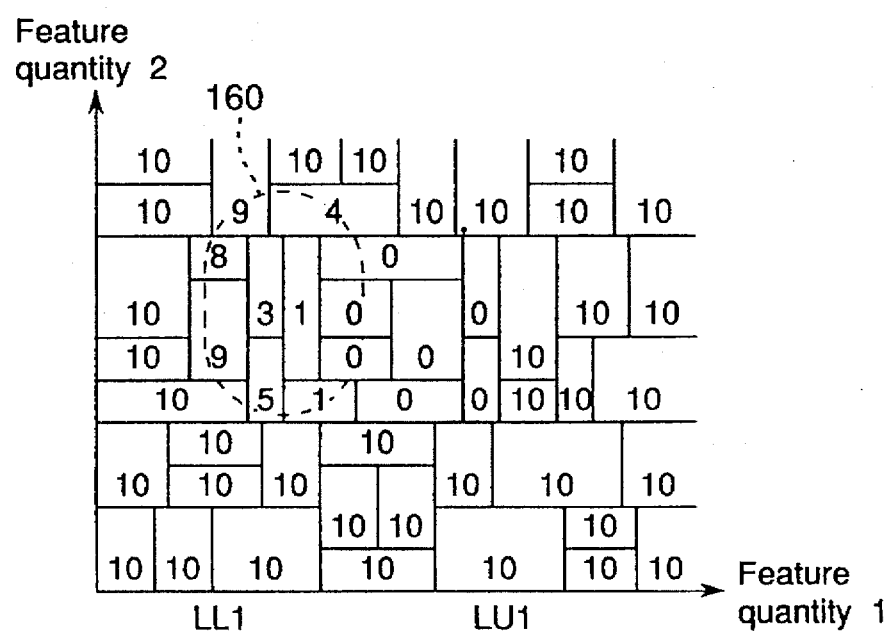

If the initial intermediate coupling coefficients shown in FIGS. 7A and 7B are revised by automatic learning with an algorithm for neural networks, the results become as shown in FIGS. 9A and 9B. In FIGS. 9A and 9B, the part enclosed by the broken curve 160 is the area in which learning samples have fallen, and revisions of the intermediate coupling coefficients are observed. The boundary between the discriminant areas for nondefectives and for defectives after the revision is shown in FIG. 10. In FIG. 10, the shaded part is the area for nondefectives and the other part is the area for defectives. As seen from FIG. 10, even if learning data is biased as the case often happens in actual processes, inspection better than by the prior method is possible by the present method.

If the initial discriminant area for nondefectives is made narrower, then as in the first method, the incorrect judgment that defectives are taken for nondefectives is reduced, so that even if chances to learn of defectives are rare owing to infrequent occurrences of defectives as in actual processes, good inspection is made possible.

An embodiment of a third method in accordance with the present invention is concerned with initial quantization-range setting process 84 shown in FIG. 1. The third method increases inspection accuracy and reduces required memory capacity by narrowing the widths of quantization ranges near the border between the discriminant areas for nondefectives and defectives.

Figure 11:
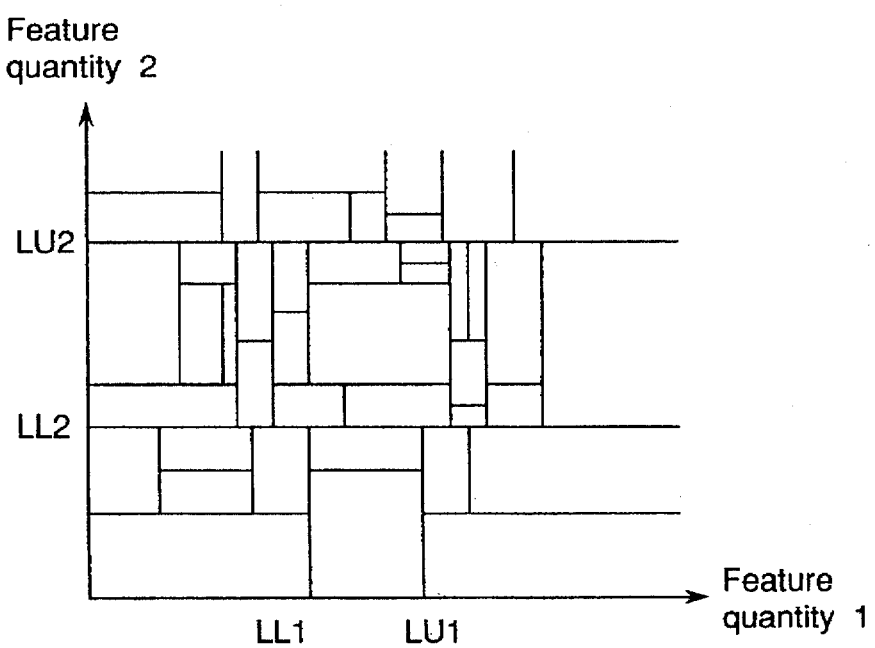
FIG. 11 shows quantization ranges set by a third method of the present invention.

According to the third method, initial quantization ranges before learning are set as shown in FIG. 11, where LU1 and LU2 respectively indicate expected upper limits of feature quantities 1 and 2, and LL1 and LL2 respectively indicate expected lower limits of feature quantities 1 and 2. Compared with quantization ranges shown in FIG. 9, the widths of quantization ranges near the border between the areas for nondefectives and defectives are narrower, and the width of quantization ranges in the other part are wider. The total numbers of quantization ranges are 51 in FIG. 9 and 41 in FIG. 11. Each quantization range has as its internal information the following information and the coupling coefficient between each of third neurons 97a and 97b and the second neuron 94 that corresponds to the quantization range:

Average values of input data

Variances of input data

Upper limits of the quantization range

Lower limits of the quantization range

Total number of learning processes

Required memory capacity for storing the above information is proportionate to the total number of quantization ranges, so that the third method reduces the required memory capacity to 41/51 of the required memory capacity for the second method.

An embodiment of a fourth method in accordance with the present invention is concerned with feature-quantity conversion process 80 shown in FIG. 1. Feature-quantity conversion process 80 has conversion tables for converting input feature quantities, and converts feature quantities calculated in feature-quantity calculating process 41, using the conversion tables, to output into the neural network. By this process, if inspecting standards are changed, then relearning by the neural network is made unnecessary by changing the conversion tables.

For example, suppose that two feature quantities, the area of grease-applied part and the x coordinate of the center of gravity of grease-applied part, are used, and suppose that expected upper limits and lower limits for nondefectives are as shown in the following Table 1. Then if calculated feature quantities are as shown in Table 1, then judgment results show that the inspected object is defective. However, if the area of grease-applied part is allowed to be less than the current standard as a result of recent examinations, then expected upper and lower limits for nondefectives can be altered to the values shown in Table 2 in the following way.

TABLE 1

|  | Calculated feature quantities | Expected lower limits for nondefectives | Expected upper limits for nondefectives |
|---|---|---|---|
| Area | 521 | 550 | 850 |
| X coordinate of center of gravity | 222 | 180 | 320 |

TABLE 2

|  | Expected lower limits for nondefectives | Expected upper limits for nondefectives |
|---|---|---|
| Area | 500 | 850 |
| X coordinate of center of gravity | 180 | 320 |

Figure 12A:
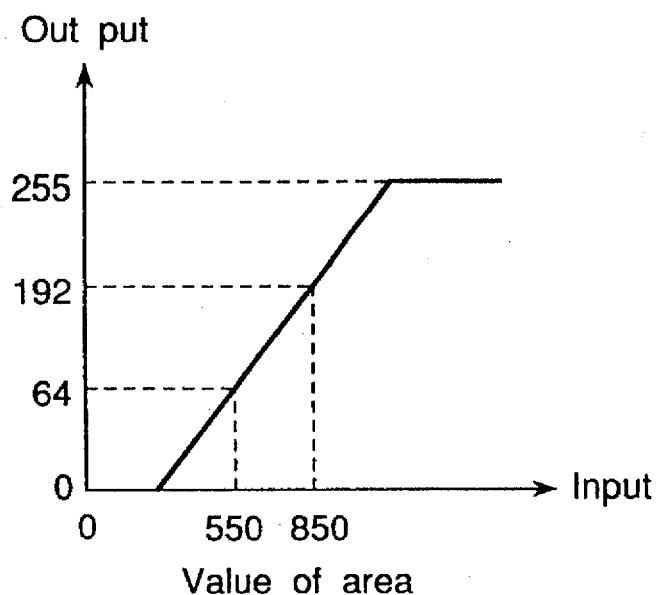
FIGS. 12A and 12B show conversion tables in a fourth method of the present invention.
Figure 12B:
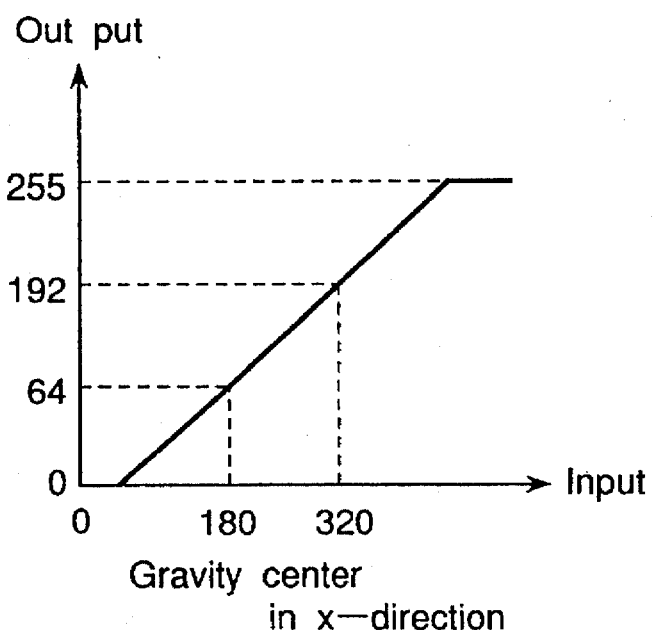
Figure 13:
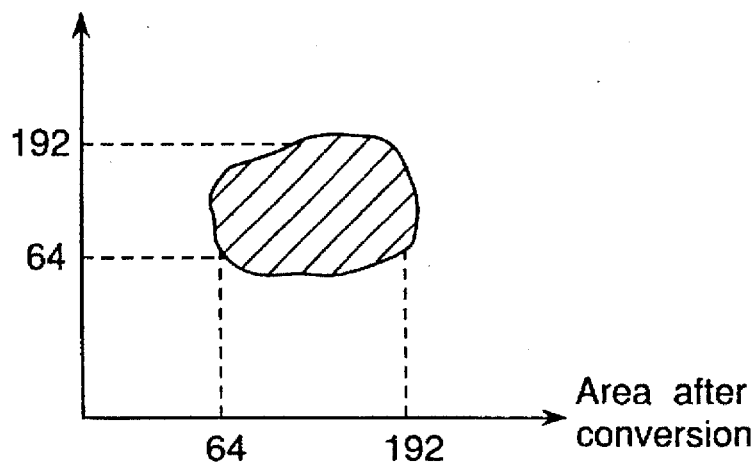
FIG. 13 shows discriminant areas of feature quantities determined after learning when the fourth method is applied.
Figure 14:
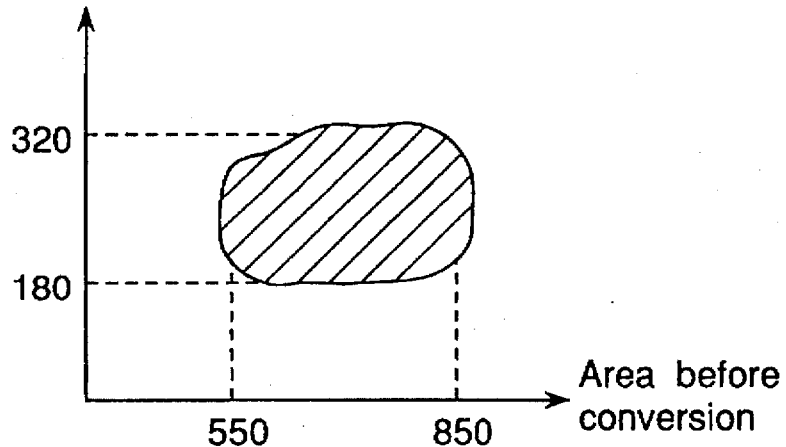
FIG. 14 shows discriminant areas of feature quantities determined after learning when fourth method is applied.

First, FIGS. 12A and 12B show the conversion tables for feature quantities before the change in inspecting standards. The calculated feature quantities are respectively converted into values within the interval [0, 255] by the conversion tables, and expected lower and upper limits for nondefectives are respectively converted to 64 and 192. Then the neural network performs learning for the converted values. The discriminant areas for converted feature quantities in the feature-quantity space become, after the conversion and learning, as shown in FIG. 13, which is contrasted with FIG. 14 that shows the discriminant areas without conversion.

Figure 15:
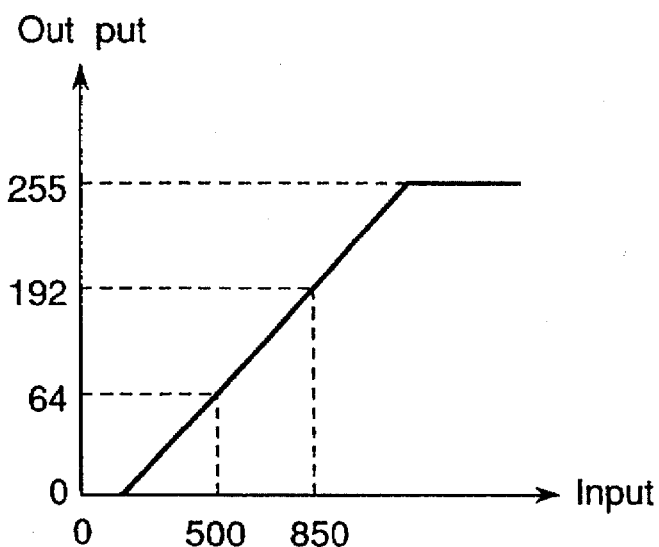
FIG. 15 shows a revised conversion table in the fourth method.
Figure 16:
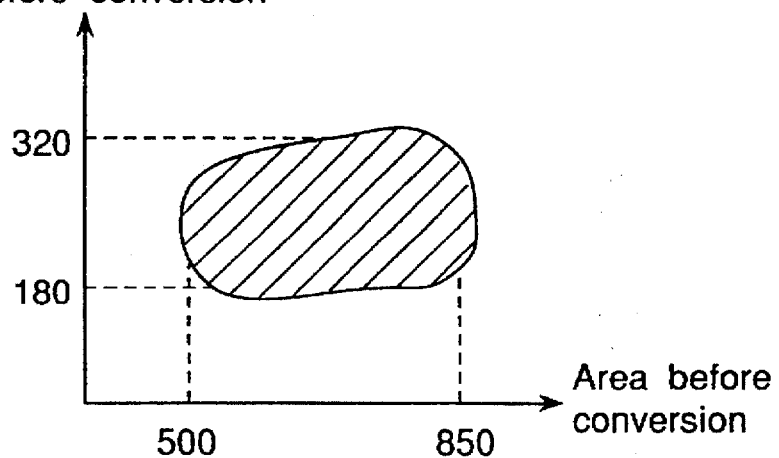
FIG. 16 shows discriminant areas of feature quantities determined after learning when the fourth method is applied.

In order to change the expected upper and lower limits for nondefectives to the values of Table 2, the conversion table of FIG. 12A is altered as shown in FIG. 15. By this alteration, the discriminant areas in the feature-quantity space become, after the conversion and learning, identical to the ones shown in FIG. 13, which is contrasted with FIG. 16 that shows the discriminant areas without the conversion.

The adaptive propagation and quantization neurons used in the networks of the present invention may be either scaler quantization neurons or vector quantization neurons, as shown in the aforementioned reference.

The first method of the present invention sets initial intermediate coupling coefficients so that the outputs of third neurons lead to the judgment that any inspected object is defective before learning. By this method, revision of the intermediate coupling coefficients can be made by learning of only nondefectives, as in actual inspecting processes in which almost all products in the line are nondefectives, so that learning can be completed in a short time, and the error that defectives are judged to be nondefective is eliminated. Hence the method has effects that allow the inspection to be performed with great reliance.

The second method of the present invention sets initial intermediate coupling coefficients so that the outputs of third neurons lead to the judgment that inspected objects expected to be nondefective are nondefective and inspected objects expected to be defective are defective. This method makes possible good judgment even at an early stage of learning and successively improves inspection accuracy through learning.

The third method of the present invention narrows quantization ranges near the expected border between the discriminant area for nondefectives and the discriminant area for defectives and widens quantization ranges in the other part. This method reduces the total number of quantization ranges and required memory capacity.

The fourth method of the present invention converts feature quantities calculated in the feature-quantity calculating process with conversion tables to output into the input neuron. This method has effects that only the conversion tables should be altered and relearning is unnecessary, when inspecting standards are changed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An inspection method comprising steps of picking up an image of an object to be inspected by a visual sensor to output a video signal;

digitizing said video signal to obtain digital image data;

calculating feature quantities based on said digital image data;

inputting said feature quantities into a neural network comprising an input neuron, which is an adaptive propagation and vector quantization neuron, a plurality of intermediate neurons, each uniquely corresponding to one of quantization ranges present in said input neuron and a plurality of output neurons the number of which is equal to that of outputs to be needed;

quantizing said feature quantities based on predetermined quantization ranges in said input neuron, calculating coupling coefficients between said input neuron and each of said plurality of intermediate neurons based on said feature quantities quantized in accordance with said predetermined quantization ranges to output a first output signal determined by said coupling coefficients to said plurality of intermediate neurons, obtaining a second output signal in each intermediate neuron by multiplying said input first output signal with an intermediate coupling coefficient between said each intermediate neuron and one of said plurality of output neurons which has been determined by learning to output said second output signal to the corresponding output neuron, converting said second output signals input from respective intermediate neurons into judging data using a function of said second output signals as variables in each of said plurality of output neurons; and judging whether said object is nondefective or defective by comparing judging data output from said plurality of output neurons with each other wherein said intermediate coupling coefficients are set so that any object is judged to be defective before starting learning and are fitted so that if an object is nondefective then it is judged to be nondefective by performing learning with use of nondefective objects.

2. The inspection method according to claim 1 wherein said quantization ranges locating on or near a border expected to be between an area of feature quantities to be judged defective and that to be judged nondefective are narrowed and other quantization ranges are widened.

3. The inspection method according to claim 1 further comprising a step of converting calculated feature quantities with scale conversion tables.

4. An inspection method comprising steps of picking up an image of an object to be inspected by a visual sensor to output a visual signal;

digitizing said video signal to obtain digital image data;

calculating feature quantities based on said digital image data;

inputting said feature quantities into a neural network comprising an input neuron, which is an adaptive propagation and vector quantization neuron, a plurality of intermediate neurons, each uniquely corresponding to one of quantization ranges present in said input neuron and a plurality of output neurons including a first output neuron for outputting a maximum value among said plurality of output neurons if an object is said plurality of output neurons which has been determined by learning to output said second output signal to the corresponding output neuron;

converting said second output signals input from respective intermediate neurons into judging data using a function of said second output signals as variables in each of said plurality of output neurons; and judging whether said object is nondefective or defective by comparing judging data output from said plurality of output neurons with each other;

wherein said intermediate coupling coefficients are set initially so that said first output neuron outputs a maximum value among said plurality of output neurons for input feature quantities of an object within a range expected defective and a second output neuron for outputting a maximum value among values output from said plurality of output neurons if an object is nondefective;

quantizing said feature quantities based on said present quantization ranges in said input neuron;

calculating coupling coefficients between said input neuron and each of said plurality of intermediate neurons based on said feature quantities quantized to output a first output signal determined by said coupling coefficients to said plurality of intermediate neurons;

obtaining a second output signal in each intermediate neuron by multiplying said input first output signal with an intermediate coupling coefficient between said each intermediate neuron and one of to be defective and said second output neuron outputs a maximum value among said plurality of output neurons for input feature quantities of an object within a range expected to be nondefective.

5. The inspection method according to claim 4 wherein said quantization ranges locating on or near a border expected to be between an area of feature quantities to be judged defective and that to be judged nondefective are narrowed and other quantization ranges are widened.

6. The inspection method according to claim 4 further comprising a step of converting calculated feature quantities with scale conversion tables.

* * * * *